(12) United States Patent
Blankenship

(10) Patent No.: US 6,248,976 B1
(45) Date of Patent: Jun. 19, 2001

(54) METHOD OF CONTROLLING ARC WELDING PROCESSES AND WELDER USING SAME

(75) Inventor: George D. Blankenship, Chardon, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 0 days.

(21) Appl. No.: 09/524,898

(22) Filed: Mar. 14, 2000

(51) Int. Cl.[7] .................................................. B23K 9/095
(52) U.S. Cl. ................. 219/130.21; 219/130.33; 219/137 PS
(58) Field of Search .......... 219/130.21, 130.33, 219/137 PS, 124.03, 124.02, 99, 98

(56) References Cited

U.S. PATENT DOCUMENTS

| | | | |
|---|---|---|---|
| 4,631,385 | * 12/1986 | Rothermel | 219/124.03 |
| 5,043,557 | * 8/1991 | Tabata et al. | 219/130.51 |
| 5,756,967 | * 5/1998 | Quinn et al. | 219/130.21 |
| 5,958,263 | * 9/1999 | Franz | 219/99 |
| 6,002,104 | * 12/1999 | Hsu | 219/137 PS |

* cited by examiner

*Primary Examiner*—Clifford C. Shaw
(74) *Attorney, Agent, or Firm*—Vickers, Daniels & Young

(57) ABSTRACT

A method of generating a real time control signal for use in an electric arc welding process having welding voltage and welding current, said method comprising: measuring the welding voltage and welding current at a first time, momentarily changing either the welding voltage or welding current by less than about 10%, then measuring the welding voltage and the welding current after the change at a second time, determining the welding voltage difference between the first time and the second time, determining the welding current difference between the first time and the second time, producing a derivative value representing the desired control signal by dividing the welding voltage difference between the first and second times by the welding current difference between the first and second times and generating the control signal by the derivative value.

39 Claims, 10 Drawing Sheets

$$V_a = A + BL_{arc} + I_a[R_{arc} + R_{ESO}]$$

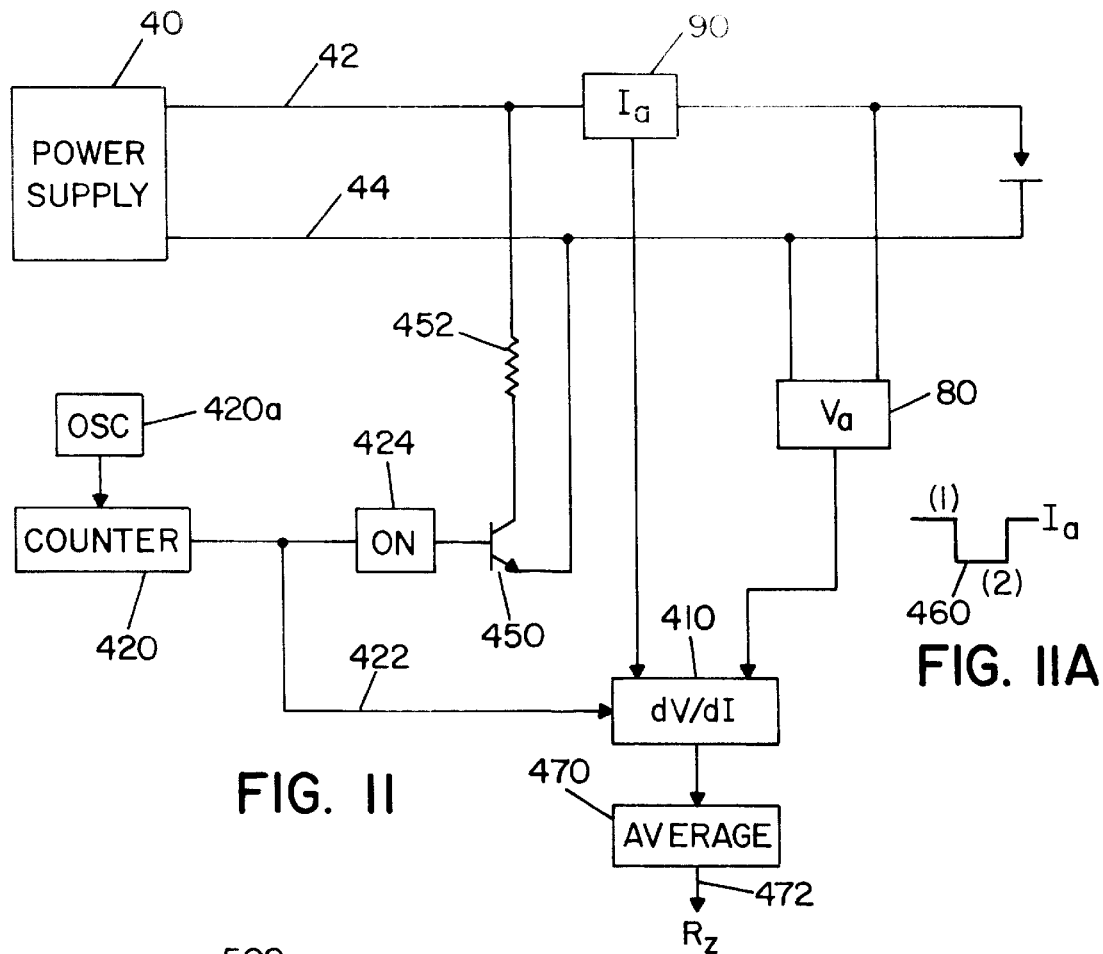
FIG. 11
FIG. 11A
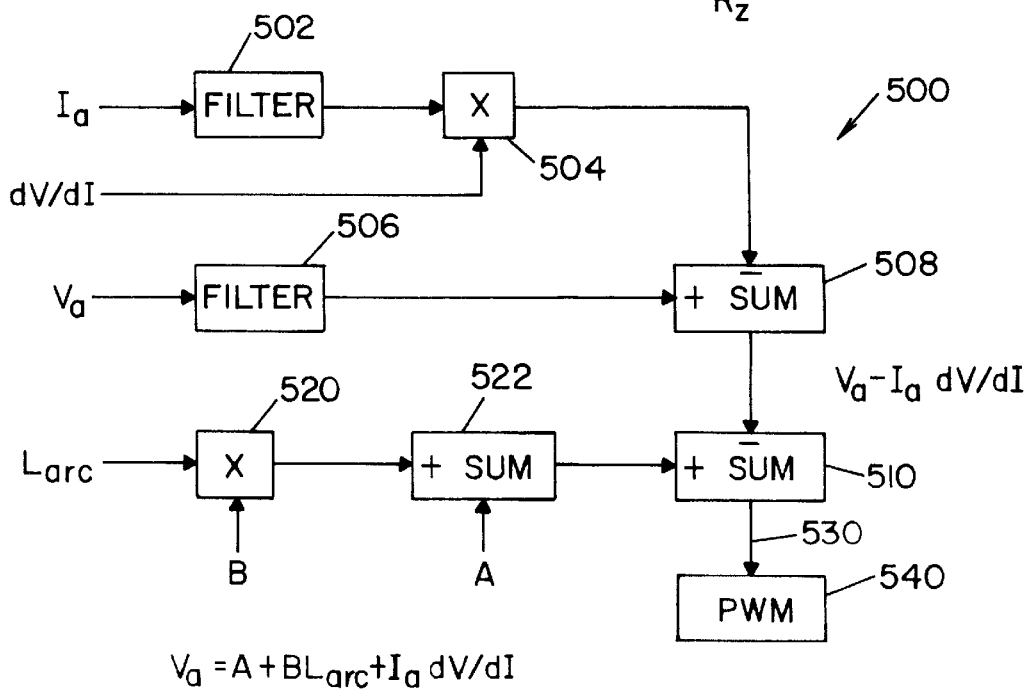
$V_a = A + BL_{arc} + I_a \, dV/dI$ $V_a = A + BL_{arc} + I_a K_1 dV/dI$

METHOD OF CONTROLLING ARC WELDING PROCESSES AND WELDER USING SAME

The present invention relates to the art of electric arc welding and more particularly to a method of controlling arc welding processes using a unique control parameter and a welder having a controller for developing and using such unique parameter.

BACKGROUND OF INVENTION

Electric arc welding is a complex electrical phenomenon having many process control variables affecting the quality of the weld, whether using spray transfer, pulse transfer, DC GMAW welding or AC welding. In constant voltage welding processes, the welding process is normally controlled by the welding current $I_a$. When the voltage is held constant, changes in the CTWD cause current changes as well as other process variations; therefore, control arrangements using the volts/ampere characteristics curve for the process have inherent limitations. The contact tip to work distance CTWD has a major influence on current since the current increases as the CTWD decreases and vice versa. Attempts to regulate the DC GMAW welding process based upon electrode stickout or CTWD have presented difficulties, since these parameters are difficult to determine on a real time basis. There is no weld process parameter heretofore measurable that provides a control signal essentially unaffected by arc current. Even more importantly, there has been no parameter to create a control signal to directly regulate on a real time basis the arc length. It is known that maintaining this distance between the bottom of the electrode and the workpiece at a fixed value will result in superior and repeatable weld quality.

THE INVENTION

The present invention overcomes prior difficulties in controlling arc welding processes by measuring a parameter to create a unique control signal that is representative of the resistance of the arc, but is not dependent upon the welding current. Consequently, the control signal created by using the invention is not affected by the large number of variables associated with control based upon welding current. In accordance with the present invention, the derivative of the welding voltage with respect to the welding current is measured to provide a parameter value used as a control signal for maintaining a weld condition, such as the arc length, during a welding process. The derivative of the welding voltage with respect to the welding current is a constructed, unique control parameter distinctly different than the load resistance obtained by merely dividing the voltage by the current. This unique parameter has not been constructed and/or used in electric arc welding for creating a signal to control the welding process.

The invention is primarily concerned with a parameter indicative of the property of a welding process that can generate a real time control signal for maintaining arc length at a selected distance. The complimentary electrode stickout (ESO) combined with the arc length equals the contact tip to work dimension CTWD.

The arc voltage $V_{arc}$ of a welding process includes a component equal to a constant A plus a constant B multiplied by the arc length $L_{arc}$. The first constant A is the work function at the cathode plus the anode and cathode voltage drops. The anode and cathode voltage drops are known to be approximately 4.15 volts for ferrous materials. The preferred embodiment of the invention is a process for welding steel; however, other metals, such as aluminum, are welded using the invention. Thus, the anode drop and cathode drop is a constant which equals to 8.3 volts. The work function is a cathode phenomenon and is normally about 3.7. Consequently, the first constant A to the formula providing the arc voltage is in the general range of 12.0, i.e. 8.3+3.7. The second constant B that is multiplied by the arc length $L_{arc}$ is related to the shielding gas being used in the welding process. For a gas with the composition of 85% argon and 15% carbon dioxide, this constant is 18.7. Consequently, the $V_{arc}$ varies in accordance with the first constant (12.0) plus the second constant (18.7) multiplied by the arc length $L_{arc}$ in centimeters. The other component of the arc voltage $V_{arc}$ is the welding current $I_a$ multiplied by the arc resistance $R_{arc}$. In summation, $V_{arc}=BL_{arc}+I_aR_{arc}$. Consequently, if $V_{arc}$ is known, an appropriate algorithm is used to determine arc length. Then arc length can be maintained. Since the welding current $I_a$ can be sensed, the only unknown is the arc resistance $R_{arc}$. The present invention provides a signal representative of arc resistance. Thus, the arc length can be maintained using the present invention for developing a signal or value representative arc resistance.

By using the present invention, a unique parameter, voltage relating to current, (dV/dI) is used as a control signal as a representation of arc resistance for use in maintaining arc length. This derivative function relates to the resistance of the arc itself. Indeed, it relates to the total resistance $R_{ESO}+R_{arc}$ across CTWD. Due to the low relative magnitude of $R_{ESO}$, the inventive dV/dI signal is primarily a representation of the arc resistance in an arc welding process. The inventive signal does not equal the load resistance obtained by merely dividing welding voltage by welding current on a real time basis. The invention relates to the concept of sensing the derivative of voltage with respect to current to give a resistance function that ignores current. This parameter is used to determine the voltage across the arc as well as maintaining the length of the arc.

In accordance with the invention, there is provided a method of generating a real time control signal for use in an electric arc welding process having a process welding voltage and a process welding current. This method comprises determining a derivative of the welding voltage with respect to the welding current to generate a control signal. This control signal is referred to as resistance or impedance since it involves dividing current into voltage. Thus, the novel control signal varies with the magnitude of arc resistance and is used as a direct correlation to the voltage of the arc. The pseudo resistance ("incremental resistance") is the control signal and constitutes a unique parameter that is the basic concept of the present invention. This control signal is multiplied by the actual welding current to produce a value to which the arc length value is added to obtain a signal level representing the voltage across the arc. The known control function exists where a first element (a) is the sum of a first constant (about 8–20, 12 for ferrous metals), a second constant (about 10–35, 18.5 for 90% argon, 10% $CO_2$) times arc length $L_{arc}$ is compared with a second element (b) which is arc voltage minus welding current times the arc resistance to (c) maintain arc length. The invention allows implementation of this control function by creating a control signal representing or varying with arc resistance. These control systems for maintaining arc length are accomplished by and are aspects of the present invention where a novel control signal is created as a derivative of the total voltage in the welding process with respect to the total current in the welding process.

In accordance with another aspect of the present invention, the derivative forming the primary feature of the invention is obtained by a small dither of the welding current. A dither pattern is applied to the welding current to determine the "incremental impedance" or "incremental resistance" $R_z$ of the welding circuit. Before the dither, the voltage and current are sensed. The dither pattern then increases current and waits for a time delay. This delay removes distortion caused by inductive reactance. The voltage and current is again measured and recorded. By subtracting the voltage readings and subtracting the current readings the derivative of voltage to current is obtained by dividing the voltage difference by the current difference. By using a derivative of the relationship between voltage and current, a high resolution circuit is used because the difference in current is quite small and the resulting derivative value is in the general range of 0.005–0.075 ohms. The difference in voltage is also quite small and is in the general range of 0.15 to 2.0 volts. Consequently, high resolution is used for the sensing. However, absolute accuracy is not critical since the incremental impedance value is a derivative measurement. Thus, resolution is required, but accuracy of the data values is not critical. Since large values of the current dither will also affect arc length, the dither is limited to a small percentage of the welding current to avoid influencing the arc length. In practice, the dither of the current is less than about 10% and generally less than about 5% of the current being used in the welding process. Although the derivative can be obtained by merely increasing the current to measure the voltage and current before and after the increase, in the preferred embodiment of the invention, the current is increased preparatory to a second voltage and current measurement. Thereafter, the current is decreased below the welding current to give a third measurement. Following this measurement, the current is raised back to the welding current for a fourth measurement. Consequently, there are four readings of voltage and current to provide three separate difference values gathered for one current dither pattern. The second difference value is based upon substantially larger current variation than the first or the last current differences caused by the dither pattern. By obtaining three sets of differences, dividing them to give derivatives and then averaging them by dividing the sum of the derivatives by three, a better representation of the actual derivative value or control signal is obtained.

The preferred method for obtaining the incremental impedance ($R_z$) employs the power source control system of the welder to pertubate the current wave form. The resulting voltage and current data is measured to obtain dV/dI in the manner described above. Alternatively, the power source itself pertubates the voltage wave form. The resulting voltage and current data is measured to obtain dV/dI. In another embodiment, the power source is used to pertubate a signal relating to the current or voltage, such as input to the pulse width in a PWM controlled welder. The resulting voltage and current data is then measured. Still a further embodiment uses an external circuit, such as the high power function generator to inject a pertubation in the current or voltage. The resulting voltage and current data is measured to obtain dV/dI. A further embodiment of the present invention pertubates the output of the power source with an external circuit, such as high power transistor used to shunt a portion of the current from the arc. The resulting voltage and current data is measured to obtain dV/dI. Although the preferred embodiments involve abrupt increases and decreases in either the current or voltage to obtain the differential values used in the present invention, it is possible to dither with a sine wave or other arbitrary wave form since the timing of the pertubations are not critical to creation of the derivative signal dV/dI. There is a time delay before each measurement so the inductive reactance does not introduce an error in the measurement results. The difference in voltage is sensed after the current has stabilized. It has been found that the time for stabilization is in the general range of 50–100 microseconds. These are minimum delays and longer delays are irrelevant.

In the multiple data gathering dither pattern of the present invention the current is shifted positive and then negative. This helps to balance the small, instantaneous arc length changes caused by the dither. Equal positive and negative transitions of shifts balance the power source output so that the melt off rate is not affected by the dithers of the current. The second current shift in the dither pattern is generally twice the first current transition. This doubles the gathered data values to provide better resolution. By using three consecutive derivatives, a more consistent control signal is generated. In practice, the voltage and current measurements are taken about each 10 milliseconds. Such timing does not alter most wave form control wave forms. The dV/dI data is extracted for the purpose of estimating electrode stickout and arc length.

As explained above, many control mechanisms are possible to pertubate the output of the power source and measure the necessary data to obtain dV/dI. Most high speed welding power sources are based upon switching power supplies, such as a buck converter or DC-DC converter. Switching noise makes precise measurement of the welding current and voltage very difficult unless special circuits are employed to avoid the sampling of noise. The preferred method to achieve the dV/dI measurement when using a high speed switching power supply is to use a high speed embedded control algorithm specially designed to control the pertubation and measure the necessary data in synchronization with the switching of the power supply. At the time dV/dI measurement is required, the main welding power system passes the control to the embedded algorithm. The embedded algorithm steps the current in the described sequence and measures the data at precise times during the switching of the power semi-conductors in the power supply. Once the data is obtained, control is passed back to the main welding control system. Implementation of the embedded control system is by a digital signal processor, programmable gate array or a microprocessor. Of course, alternative schemes are available for obtaining the current dither and data gathering for practicing the present invention.

To obtain the dV/dI control signal as a real time function, the current or voltage is pertubated and measured at different times to obtain the derivative value. Better resolution and noise immunity is obtained by introducing more than one step of pertubations. The dV/dI value is generated to provide a control signal that is the average of several dV/dI measurements after pertubations. This procedure may be used for welding processes employing an arc, such as spray transfer, pulse transfer, short circuit transfer (during plasma portions of the cycle), DC and AC metal welding. Each of these welding processes has a processed current through an arc which current be dithered to create the incremental impedance or resistance $R_z$ for use in maintaining a preselected arc length or other parameter of the welding process.

The primary object of the present invention is the provision of a method and system for creating a control signal to be used in an electric arc welding process, which control signal is the derivative of voltage with respect to current. The control signal is used to obtain other parameters for feedback loop control of the welding process, primarily to maintain a preselected arc length.

Yet another object of the present invention is the provision of a method and system, as defined above, which method and system can be used to accurately obtain a control function for maintaining arc length or other parameters.

Still a further object of the present invention is the provision of a method and system, as defined above, which method and system accurately measures various parameters in an electric arc welding process. These parameters have not been easily obtainable in prior controls.

These and other objects and advantages will become apparent from the following description taken together with the accompanying drawings.

BRIEF DESCRIPTION OF DRAWINGS

FIG. 11 is a block diagram showing still a further embodiment for obtaining the basic control signal $R_z$ used in practicing the present invention;

FIG. 11A is a graph showing a portion of the dither obtained by the embodiments shown in FIG. 11;

FIG. 12 is a block diagram of a software system for maintaining arc length using the inventive signal $R_z$ without operator intervention;

PREFERRED EMBODIMENT

Figure 1:
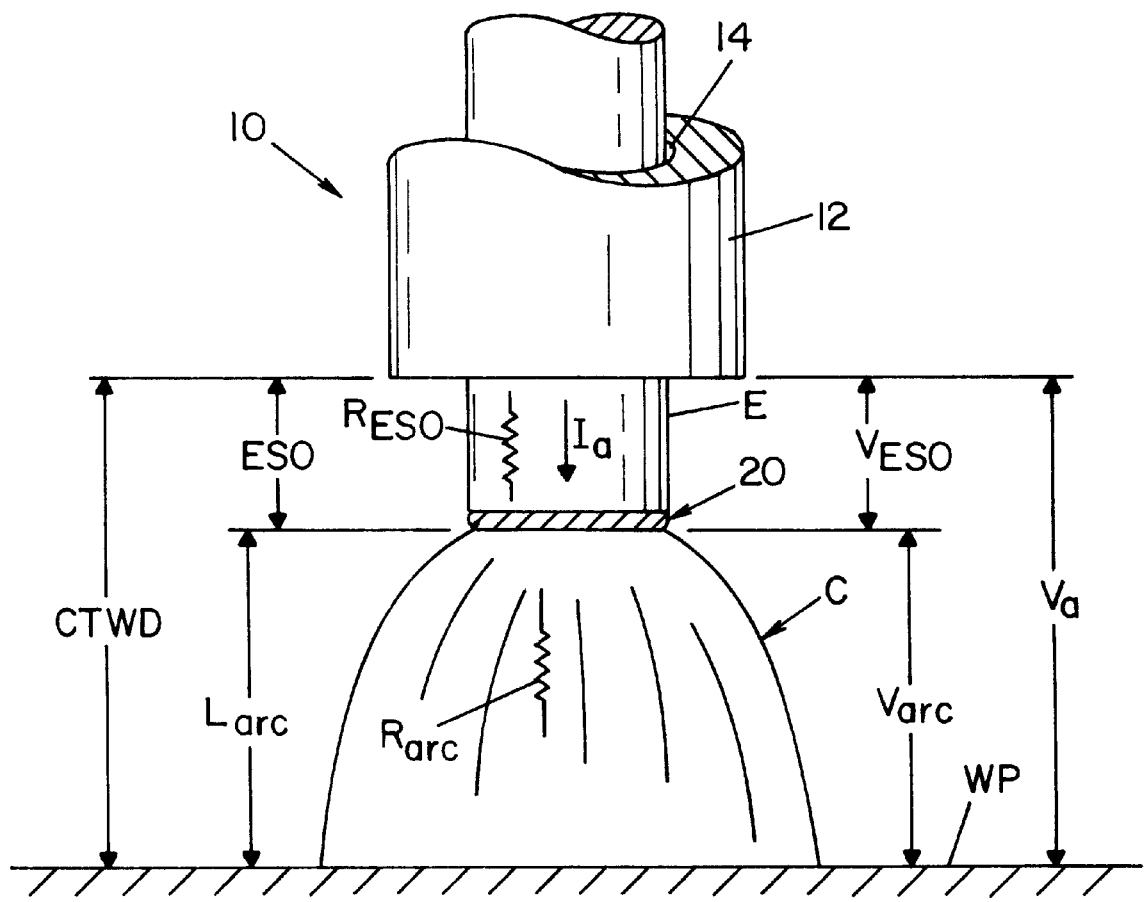
FIG. 1 is a side elevational view of an arc welding operation revealing certain standard relationships.

Referring now to the drawings wherein the showings are for the purpose of illustrating the preferred embodiment of the invention only and not for the purpose of limiting same, FIG. 1 illustrates an electric arc welding process 10 wherein contact tip 12 has an opening 14 through which is advanced steel electrode E toward a ferrous workpiece WP. The welding metals are steel in the preferred embodiment; however, other metals, such as aluminum, have been welded using the invention. Between the end of the electrode and the workpiece is an electric arc C. In practice, electric energy is directed by contact tip 12 through electrode E to create arc C to melt the end of the electrode and causes transfer of metal either by spray, short circuit or globular transfer. In the welding process, the distance between tip 12 and workpiece WP is CTWD, which is the system of electrode stickout ESO and the arc length $L_{arc}$. Welding voltage $V_{arc}$ is divided into voltage across electrode $V_{ESO}$ and the voltage across arc C which is $V_{arc}$. These parameters are standard in the electric arc welding art and are used in explaining the present invention. In the welding process, electrode E is heated by $I^2R$ heating with welding current $I_a$ as shown in FIG. 1. Heating is uniform along length ESO. Heating of the electrode is drastically different from the IV heating caused by arc C. The arc heating is normally 75–80% of the total heating of the metal melted from the end of electrode E. Melting occurs at the end of the electrode, which end is illustrated as having a barrier 20. This barrier isolates electrode E from the heat generated by arc C. As is well known, as the temperature increases, the resistivity increases; however, the resistivity of the remainder of the electrode E remains somewhat constant. The thermal conductivity and the specific heat also rise as temperature increases. Thus, barrier 20 isolates the arc from the electrode and is a very thin layer where the drastic heat increases occur for melting the metal as electrode E is advanced. The welding voltage $V_a$ is affected by a constant A which relates to the work function of the cathode or workpiece WP and the normal anode or cathode voltages which are both approximately 4.15 volts. In practice when welding steel, constant A is about 12. Constant A is added to constant B relating to the type of shielding gas multiplied by the arc length $L_{arc}$. This relationship $(A+BL_{arc})$ is summed with the product of the welding current times arc resistance $R_{arc}$ to give a value representing the arc voltage. Arc voltage is the welding voltage $V_a$ and $V_{ESO}$ that is the product of welding current $I_a$ and the stickout resistance $R_{ESO}$. Since $R_{ESO}$ is small, $V_{arc}$ is generally $V_a$. Due to these mathematical relationships, the length of the arc can be maintained by monitoring $V_a$, $I_a$ and the arc resistance.

The invention is used to construct or generate a value generally indicative of arc resistance. The mathematical relationship $(V_{arc}=A+BL_{arc}+I_aR_{arc})$ is employed in implementing the use of the parameter or unique control signal developed in accordance with the present invention. This control signal is a constructed derivative parameter dV/dI, which parameter is referred to as the incremental resistance $R_z$. Incremental resistance or incremental impedance $R_z$ relates to the summation of the arc resistance $R_{arc}$ plus the small electrode resistance $R_{ESO}$; however, it is not the load resistance which would be determined by dividing the welding voltage by the welding current. The voltage $V_{arc}$ is not directly measurable. However, voltage $V_a$ is measurable and is equal to the sum of $V_{arc}$ plus the current $I_a$ multiplied by $R_{ESO}$. $V_a=V_{arc}+I_aR_{ESO}$. Therefore, by algebraic substitution, $V_a=A+BL_{arc}+I_a[R_{arc}+R_{ESO}]$.

Figure 2:
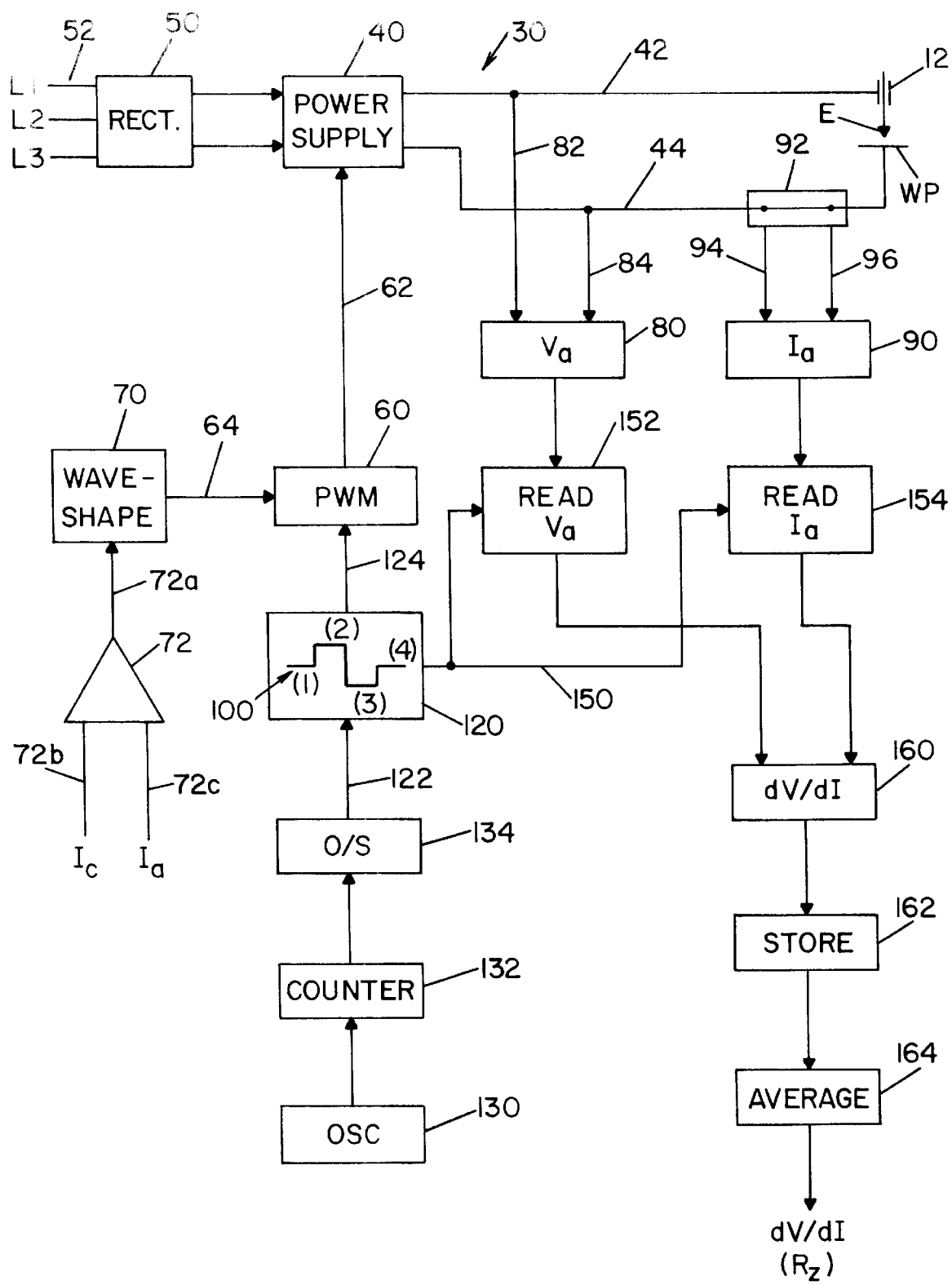
FIG. 2 is a combined wiring diagram and block diagram used in practicing the preferred embodiment of the present invention.
Figure 3:
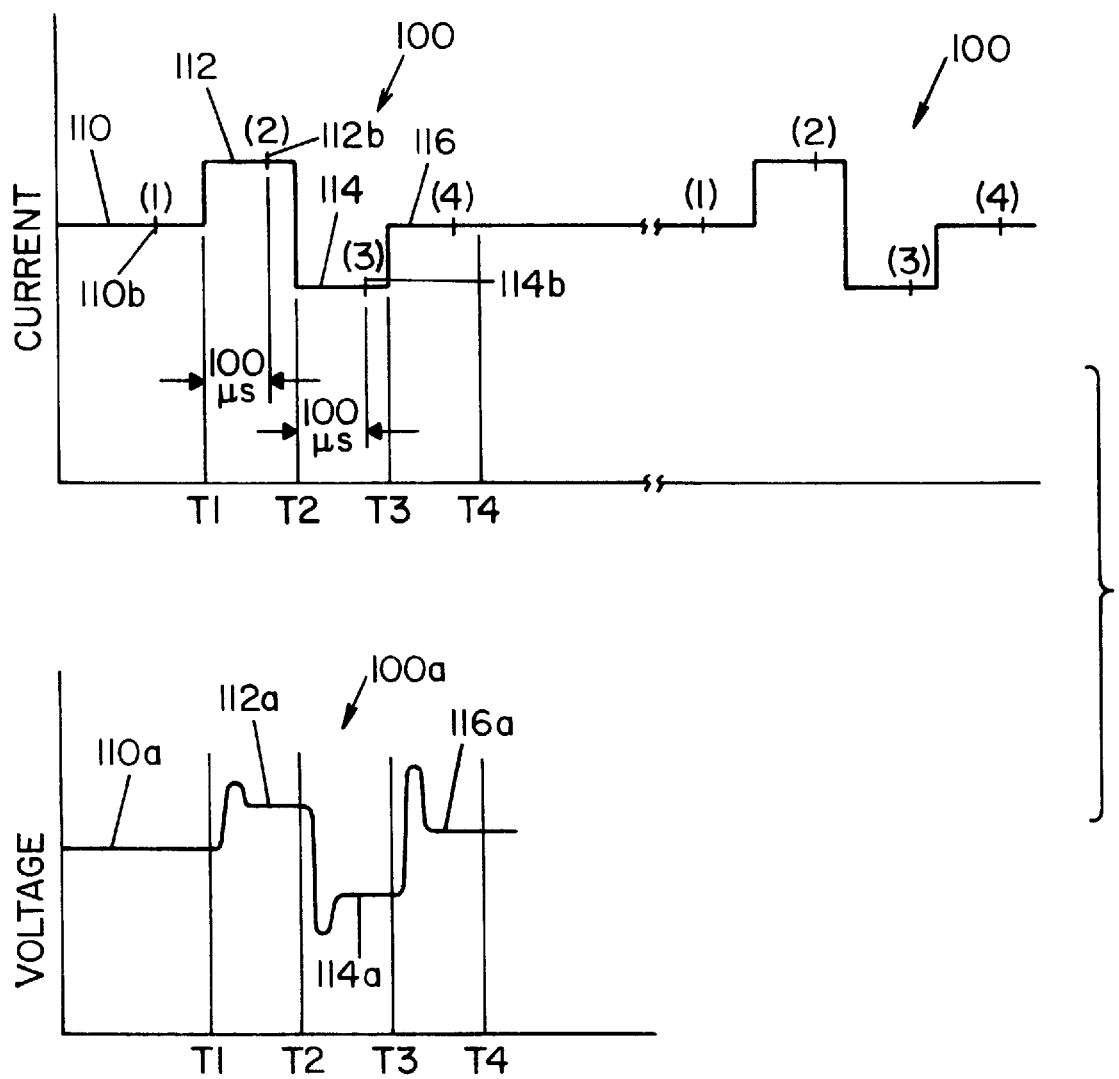
FIG. 3 is a current and voltage graph showing the pertubations of current accomplished by the preferred embodiment of the present invention as shown in FIG. 2.

To provide the novel signal dV/dI, which in practice is a digital number, several software circuits are used. In accordance with the preferred embodiment of the invention, the software circuit shown in FIG. 2 is used for creating the current pertubates shown in FIG. 3. In this embodiment, welder 30 produces a welding voltage $V_a$ across electrode E and workpiece WP. Really, the arc voltage is applied across tip 12 and workpiece WP as shown in FIG. 1. To create this voltage and, thus, the welding current $I_a$ there is provided a power supply 40 having output leads 42, 44 connected across electrode E and workpiece WP. The input of the power supply is a rectifier 50 connected to a three phase input line 52. The power supply is a high frequency switching inverter with the wave shape of the welding current determined by the signal in output line 62 of pulse width modulator 60. The modulator has an input line 64 with a voltage level or signal controlled by wave shape circuit 70 under the direction of error amplifier 72 with an output 72*a* and input 72*b,* 72*c.* Input 72*b* is the command current signal $I_c$. Input 72*c* is the welding current $I_a$ passing through electrode E and into workpiece WP during the welding operation. To measure the instantaneous or real time welding voltage, there is a sensor 80 having input leads 82, 84 connected in parallel across leads 42, 44 in accordance with standard practice. In a like manner, sensor 90 senses the welding current $I_a$ from a shunt 92 by way of leads 94, 96. As so far described, the welder 30 operates in accordance with standard welding practice and can be used for spray welding, short circuit welding, globular welding, DC welding or AC welding. The invention is the development of a novel control signal which is the derivative of the welding voltage $V_a$ with respect to the welding current $I_a$. The welding currents and resulting welding voltage are shown in FIG. 3. To obtain the derivative signal, in accordance with the preferred embodiment of the present invention, the preferred system is shown in FIG. 2. A forced current dither pattern 100 produces a companion voltage pattern 100*a.* Pattern 100 includes increasing welding current $I_a$ from a controlled level 110 corresponding to voltage level 110*a* at time T1 to a new level 112 corresponding to voltage level 112*a.* This new level is less than 10% of current 110 and preferably less than 5% above level 110. The value of derivative signal dV/dI is obtainable from this dither by determining the voltage $V_a$ and current $I_a$ at point 1 before time T1, as indicated by scribed line 110*b,* and the voltage and current at point 2 before time T2, as indicated by scribed line 112*b.* These two voltages and currents are subtracted, then the difference in the voltage is divided by the difference in the current. The measurement at level 112 at point 2 is conducted after a time delay indicated to be 100 microseconds between time T1 and line 112*b.* This allows the voltage caused by inductive reactance to dissipate before taking readings of the voltage and current between point 1 and point 2. At time T2, the welding current is decreased to level 114, which level is generally below level 110 by the same magnitude as the increases current at time T1. Lower level 114 corresponds to voltage 114*a* as shown in FIG. 3. Just before time T3, the third measurement of voltage and current is made at point 3, as indicated by scribed line 114*b.* Thereafter, the current is raised to level 116 corresponding to original level 110. After a time delay, a fourth measurement is taken at point 4, again after a delay of about 100 microseconds. By measuring the differential between point 1 and point 2, the differential between point 2 and point 3 and the differential between point 3 and point 4, three separate readings of the same control signal are made. These three readings are recorded, added and divided by three to produce a final derivative parameter or signal corresponding to dV/dI. This novel parameter or signal is the unique control signal obtained by use of the present invention. After an arbitrary time passes, another dither pattern 100 is implemented for the purposes of making a subsequent reading of parameter or signal dV/dI. Patterns 100 are repeated periodically and on a real time basis to create the derivative value or signal to control the welding process.

Referring now again to block diagram in FIG. 2, pattern 100 is caused by overriding pulse width modulator 60 by a signal generator 120 that produces this pattern when enabled by a voltage signal on line 122. This signal is used as the second input to pulse width modulator 60 by way of line 124. Each time signal generator 120 is initiated, dither pattern 100 is implemented by the pulse width modulator. To enable the signal generator there is provided an oscillator 130 driving upcounting counter 132 to actuate one shot circuit 134 periodically. The oscillator and counter are programmed so patterns 100 are repeated periodically every few seconds. Thus, a signal in line 122 is created (10 milliseconds) to repeat dither pattern 100 in current $I_a$. At points 1, 2, 3 and 4 a signal appears in line 150 that causes the welding voltage $V_a$ to be read by block 152 and the welding current $I_a$ could be read by block 154. These two values are then divided to give the derivative, as indicated by block 160. Each derivative measurement is stored as indicated by block 162 so that the derivatives can be averaged as indicated by block 164 to give a control signal $R_z$. In pattern 100, three readings are taken. These three readings are stored and then averaged to produce the derivative signal dV/dI, which is the control signal $R_z$ as shown in FIG. 2. The signal is generally the same as a signal by only one dV/dI calculation.

Figure 4:
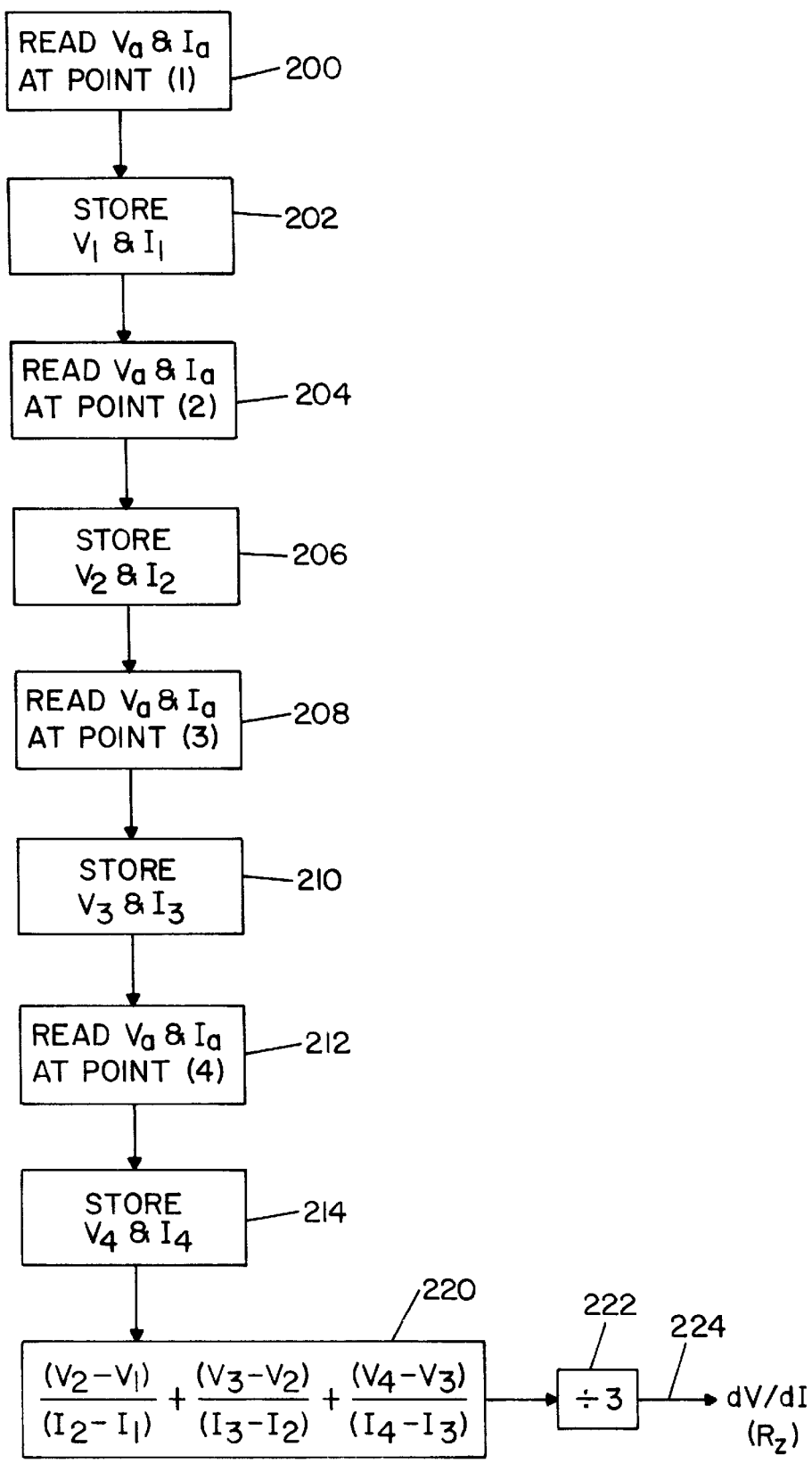
FIG. 4 is a flow chart of software program used in processing the voltage and current data obtained by the preferred embodiment of the present invention shown in FIG. 2 and FIG. 3.
Figure 5:
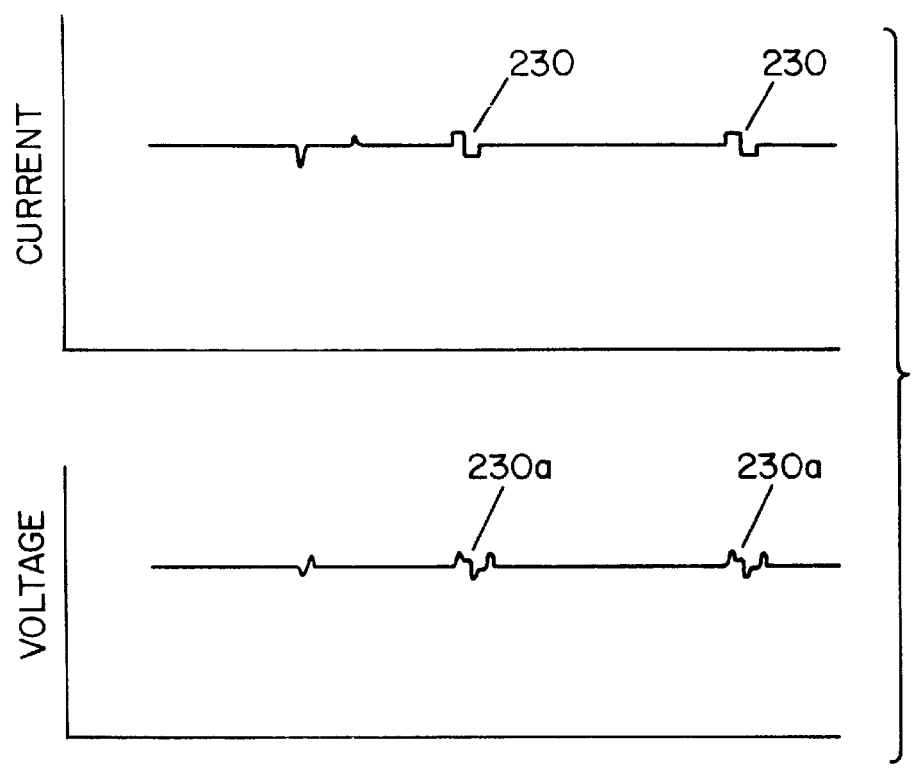
FIGS. 5–9 are a series of current and voltage graphs showing the implementation of the present invention in various types of welding processes.

The software program for averaging several control signals or incremental resistance $R_z$ is schematically illustrated in FIG. 4 for processing the data produced by the system shown in FIG. 2 to produce the dither pattern 100 shown in FIG. 3. In this program, a microprocessor or other control device reads the welding voltage and welding current at point 1 as indicated by block 200. This data is stored as indicated by block 202. Thereafter, as indicated by block 204, the welding voltage and current at point 2 is read and stored, as indicated by block 206. In a like manner, the voltage and current is read at point 3, as illustrated as block 208, and stored, as indicated in block 210. The final dither reading at point 4 is read for the voltage and current, as indicated by block 212, and stored, as indicated by block 214. Then the algorithm of the program performs the function as set forth in 220 wherein a digital number corresponding to a first derivative dV/dI is calculated. This number or value, if analog, is a unique control signal. Thereafter, the derivative calculation is repeated twice. The value (digital or analog) of these derivative calculations, all of which should be essentially the same, are added as indicated by block 220. Then the total value is divided by three as indicated by block 222 to produce an average dV/dI or $R_z$ at line 224. This is the control signal which is the average of the three previously measured control signals for use in controlling welder 30 or any other welder. Because dither pattern 100 is used in the preferred embodiment of the invention, the averaging process requires determination of three control signals $R_z$. Of course, any number of control signals can be summed and then averaged.

Figure 6:
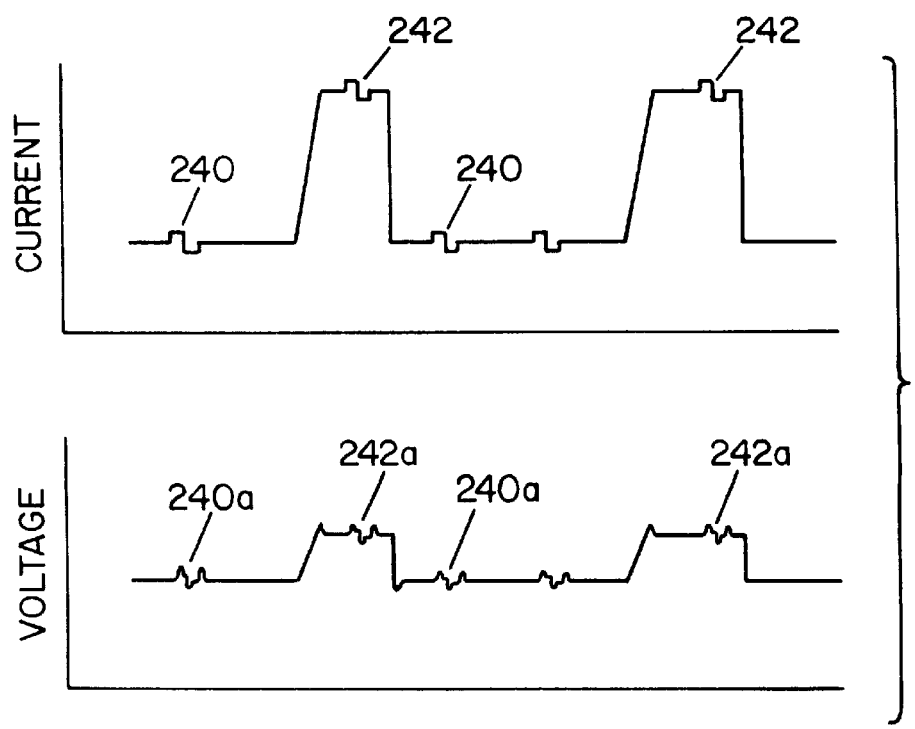
Figure 7:
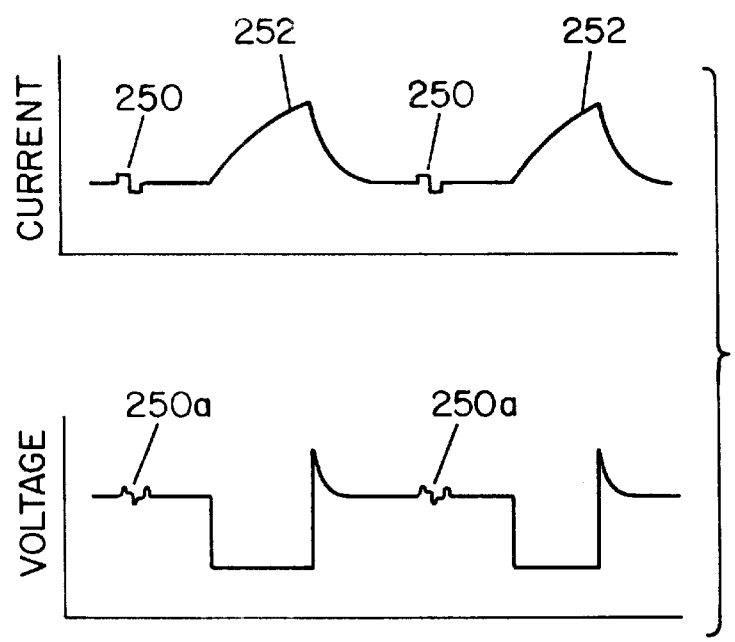
Figure 8:
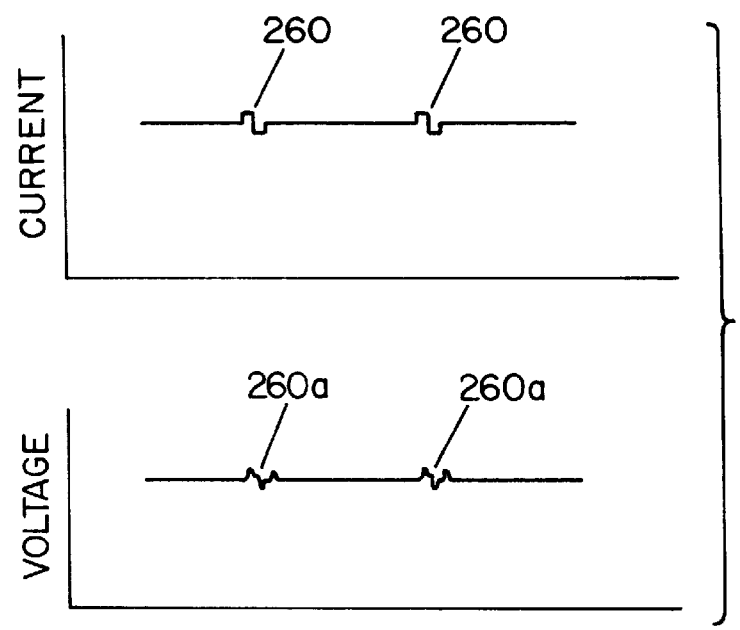
Figure 9:
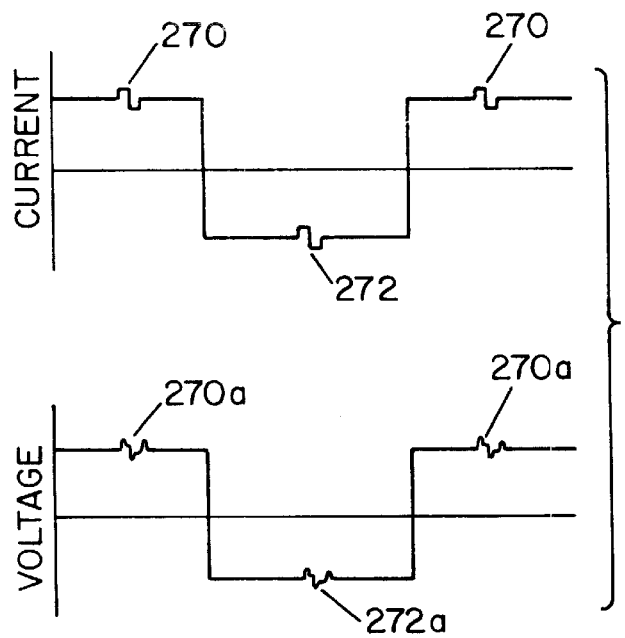

Creation of the unique control signal $R_z$ is obtainable in all welding methods using a consumable electrode and an arc at times during the welding cycle. In such processes there is an electrode stickout and an arc for melting the end of the electrode to deposit molten metal onto the workpiece. The minor current changes during dither pattern 100 are during such short times that there is no change in electrode melting. The universal application of the real time control signal $R_z$ is depicted in FIGS. 5–9. For instance, in a spray weld process having the current and voltage indicated in FIG. 5, dither pattern 230 is periodically created in the welding current. This pattern creates a corresponding dither pattern 230*a* in the welding voltage. The derivative of voltage, with respect to current, is then available for creating control signal or incremental resistance $R_z$. In a like manner, in a pulse welding process there is a background current and a peak or pulse current as shown in FIG. 6. This produces a similar voltage curve shown in the lower graph. During the background current, there is no substantial transfer of the electrode to the workpiece; however, dither pattern 240 and corresponding dither pattern 240*a* are created. This constructed dither pattern allows generation of the derivative value or signal dV/dI. More importantly, during the pulse of peak current, dither pattern 242 with a corresponding dither pattern 242a in the voltage is created. Plus, incremental resistance value $R_z$ is obtained for the peak current. This can be used to maintain arc length. Turning now to FIG. 7, a short circuit welding current and voltage is illustrated. During the arc or plasma portion of the cycle, dither pattern 250 is created in the welding current. This gives a corresponding dither pattern 250a in the voltage. There is no measurement during the short circuit portion 252 of the welding cycle because there is no arc. The STT welding cycle developed by The Lincoln Electric Company of Cleveland, Ohio can also use the present invention during the background currents and during the plasma boost. At these times, the current is maintained constant. However, during the short circuit portion of the STT, the current can not be dithered because it is not maintained constant. As can be seen, the invention is applicable in welding cycles of all types using an arc wherein the current is maintained constant and is capable of being dithered. This is further illustrated in FIG. 8 which is a constant current or constant voltage welding cycle wherein the current dither pattern 260 produces a corresponding voltage dither pattern 260a. The constant current curves are similar to the curve for spray welding shown in FIG. 5. In an AC welding operation the current is maintained generally constant, but in opposite polarities as shown in FIG. 9. During the positive polarity dither pattern 270 is created in the current resulting in a corresponding dither pattern 270a in the voltage. During the negative polarity dither pattern 272 is created in the current resulting in a voltage dither pattern 272a. The current and voltage for several common welding processes as shown in FIGS. 5–9 are presented to show universal application of the unique control signal or incremental resistance $R_z$. Of course, other electric arc welding processes having constant current during a portion of the cycle can use the present invention where the electrode is consumable and has a resistance at arc C which is generally quite high compared to the electrode resistance.

Figure 10:
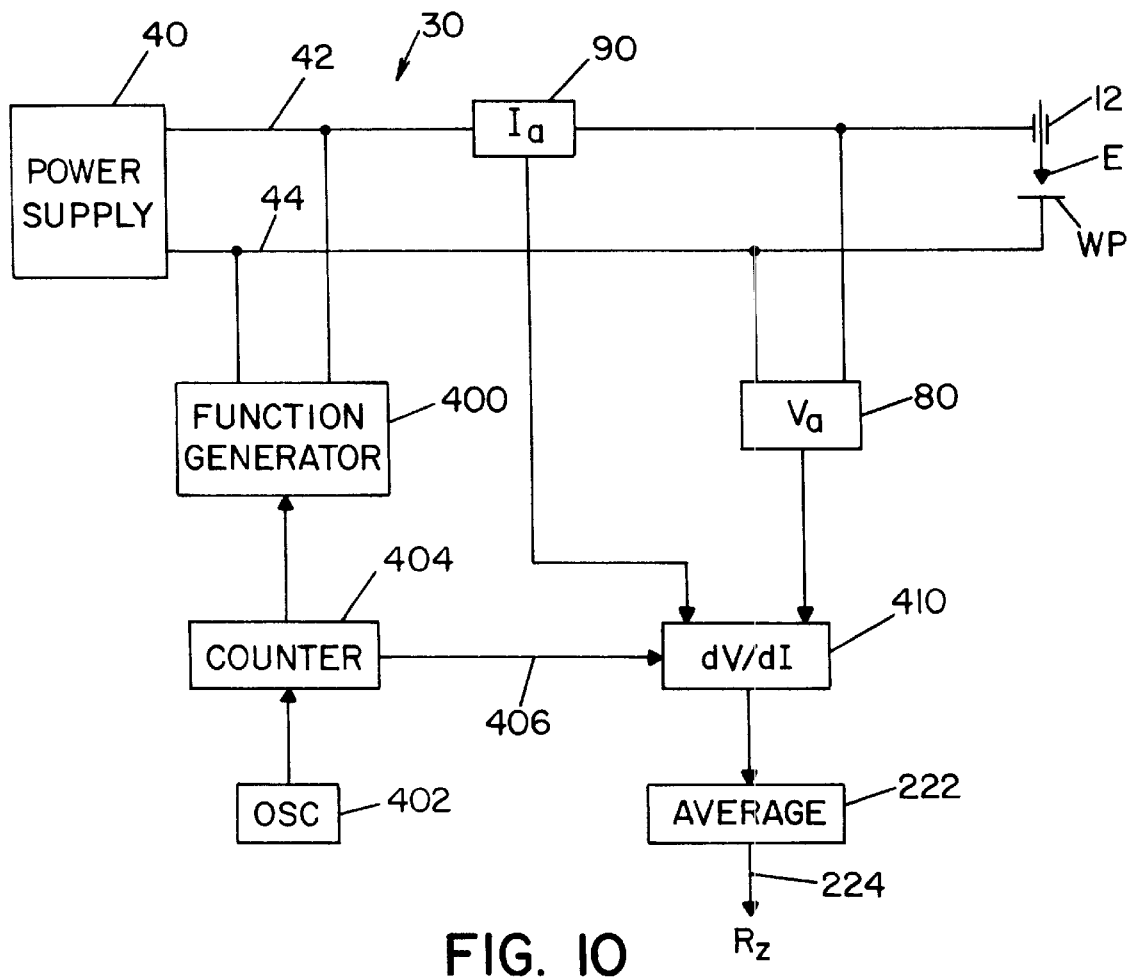
FIG. 10 is a block diagram of an alternative method for obtaining the basic control signal dV/dI created by the present invention.

In practicing the invention, a derivative of the voltage and current is obtained as a control signal. Several systems can be used for obtaining the derivative value. FIG. 2 illustrates one system whereas FIGS. 10 and 11 show other systems for accomplishing the derivative. In FIG. 10, power supply 40 includes a function generator 400 connected across output leads 42, 44. The function generator creates a dither of the current across the output of the power supply and is timed to create the specific dither desired to create several specific measurement points. Oscillator 402 drives counter 404. The output of the counter on line 406 indicates instances when the voltage and current values from sensors 80, 90, respectively are read and stored as indicated by block 410. These values are then averaged as shown in FIG. 4 by block 222 to produce the control signal $R_z$ in line 224. In a like manner, as shown in FIG. 11 counter 420 is driven by oscillator 420a to produce a series of signals on line 422 controlling gate drive 424 of switch 450. This periodically shunts a portion of the arc current $I_a$ from the arc through resistor 452. This dither pattern has only two current levels. It is shown in FIG. 11A as an enlarged curve at the right of FIG. 11. When switch 450 is conducting, current is reduced from the process welding current to a lower level 460. The voltage and current are read by block 410 at point 1 and point 2. This is the control signal dV/dI. Several of these signals can be produced in series and are averaged as indicated at block 470 to produce the control signal $R_z$ in line 472. Other arrangements could be used for digitally determining control signal dV/dI, referred to as incremental resistance $R_z$. This signal relates to the resistance in the arc.

Various systems and software architecture can be employed for obtaining control signal $R_z$. This control signal can be manipulated with various other parameters to obtain control or command signals for the welding process being implemented. Real time generation of the derivative control signal is unique in the welding art and is used for many purposes, some of which are indicated in this application as illustrative of the great advantage in obtaining dV/dI for a welding process. The use of the unique control signal as herein described is not exhaustive. Other uses of the unique control signal are within the skill of the art. The invention is used in a control system employing mathematically generated architecture or such a system simplified by empirical modifications.

FIG. 12 illustrates a presently used control system where the present invention maintains a constant arc length. The regulation of arc length $L_{arc}$ is made possible by obtaining a number of value for control signal $R_z$ or dV/dI. The welding voltage $V_a$ is equal to the electrode voltage $V_{ESO}$ plus the arc voltage $V_{arc}$ which is equal to the sum of (a) the first constant A (8–20), (b) the second constant B (10–35) multiplied by arc length $L_{arc}$, and (c) the welding current $I_a$ times $R_{arc}$, the resistance. By maintaining the arc length constant, the arc resistance does not change and the sum of the resistances $[R_{ESO}+R_{arc}]$ remains constant in an arc length control system because the arc length is held at a set value. As indicated above, the arc voltage $V_a$ equals $V_{ESO}+V_{arc}$. $V_{arc}$ equals $A+B\ L_{arc}+I_a\ R_{arc}$. Therefore, $V_a=A+BL_{arc}+I_aR_{arc}+V_{ESO}$ or $V_a=A+BL_{arc}+I_a\ [R_{arc}+R_{ESO}]$. Indeed, dV/dI generally varies directly with $[R_{arc}+R_{ESO}]$. Consequently, $V_a$ varies with dV/dI. Consequently, for control purposes, $V_a$ equals $A+B\ L_{arc}+I_a$ dV/dI. This relationship is the control equation used to maintain arc length by the system 500 using the invention, as shown in FIG. 12. The welding voltage $V_a$ is filtered at filter 502 and is multiplied by the inventive control signal dV/dI at multiplication block 504. This produces a signal level confirming to $I_a$ dV/dI. The signal level in digital format is subtracted from the feedback welding voltage $V_a$ filtered by filter 506 at summing junction 508. The level $V_a-I_a$ dV/dI is compared at summing junction or error amplifier 510 with a level or number varying with the actual arc length $L_{arc}$. This arc length controlled level is $A+B\ L_{arc}$ wherein the actual $L_{arc}$ is multiplied by second constant B (8–20) at block 520 and added to first constant A (10–35) at block 522. The error signal or level in line 530 controls standard pulse width modulator 540 to maintain the arc length $L_{arc}$. System 500 is a control system now used in practice to utilize the novel control signal $R_2$ or dV/dI for maintaining a constant arc length.

Figure 13:
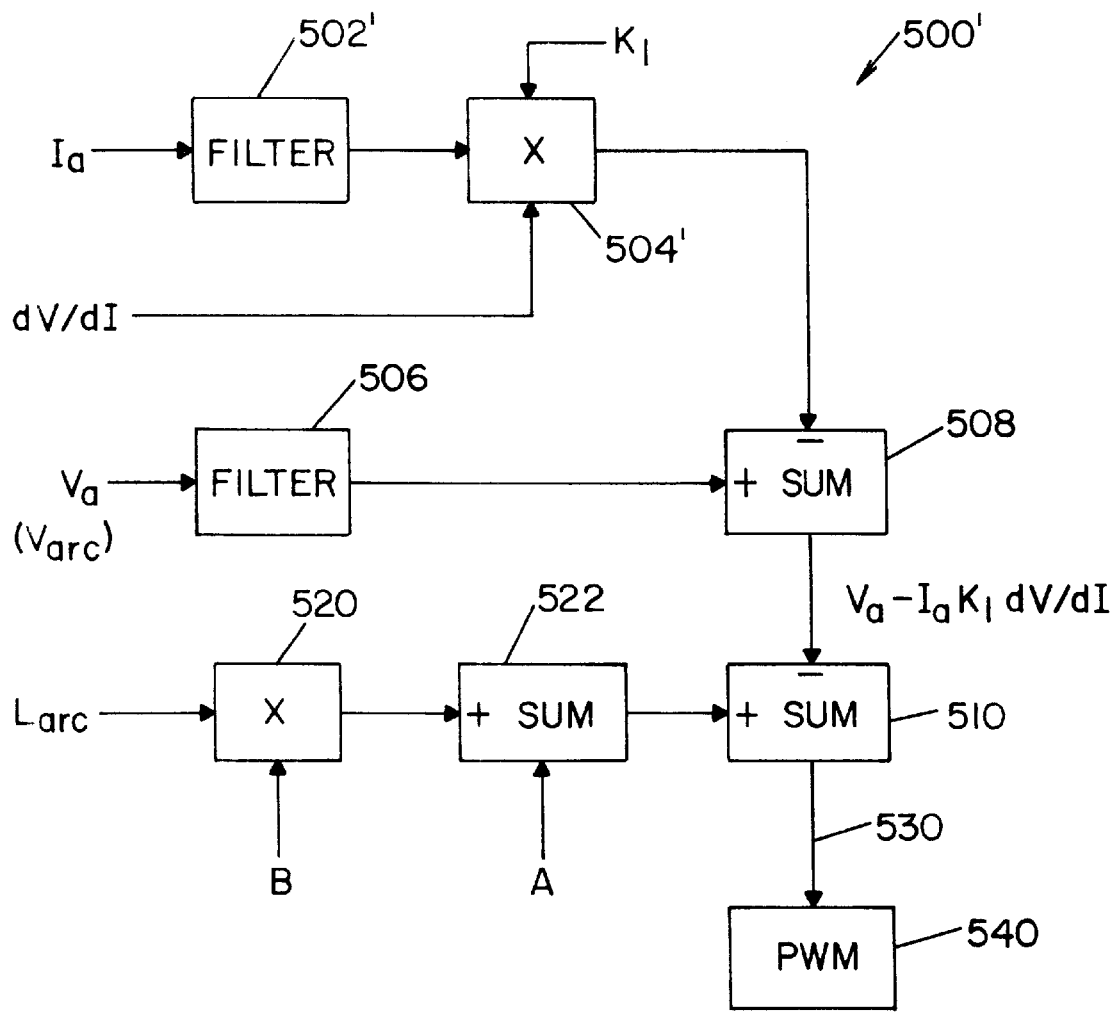
FIG. 13 is a block diagram of a software system for maintaining arc length using the inventive signal $R_z$ with operator intervention; and, FIG. 14 is a block diagram of a software system simplifying the system of FIG. 12 by an empirical modification.

Control system 500 in FIG. 12 will maintain the arc length, as the spacing of the electrode E from workpiece WP, constant. This is a primary use of the present invention. However, as wire feed speed WFS increases, current $I_a$ must increase to maintain such spacing. Higher current causes deeper penetration of the arc into the weld puddle on the workpiece. Thus, the arc length is greater than maintained spacings and the electrode is forced to greater stickout for compensation. To compensate for such deviations, the operator can be allowed to get a gain K, as shown in FIG. 13. System 500' is like system 500 except multiplication block includes an operator adjusted gain $K_1$. Gain $K_1$ is variable between 0.0 and 2.0. Normally, the operator sets gain $K_1$ to about 0.2 to 0.3. For a constant voltage welding process, the gain is generally 0.0. When fully regulating arc length, the gain is at a high level, i.e. 1.0 to 2.0. In practice, the gain is about 0.3.

Figure 14:
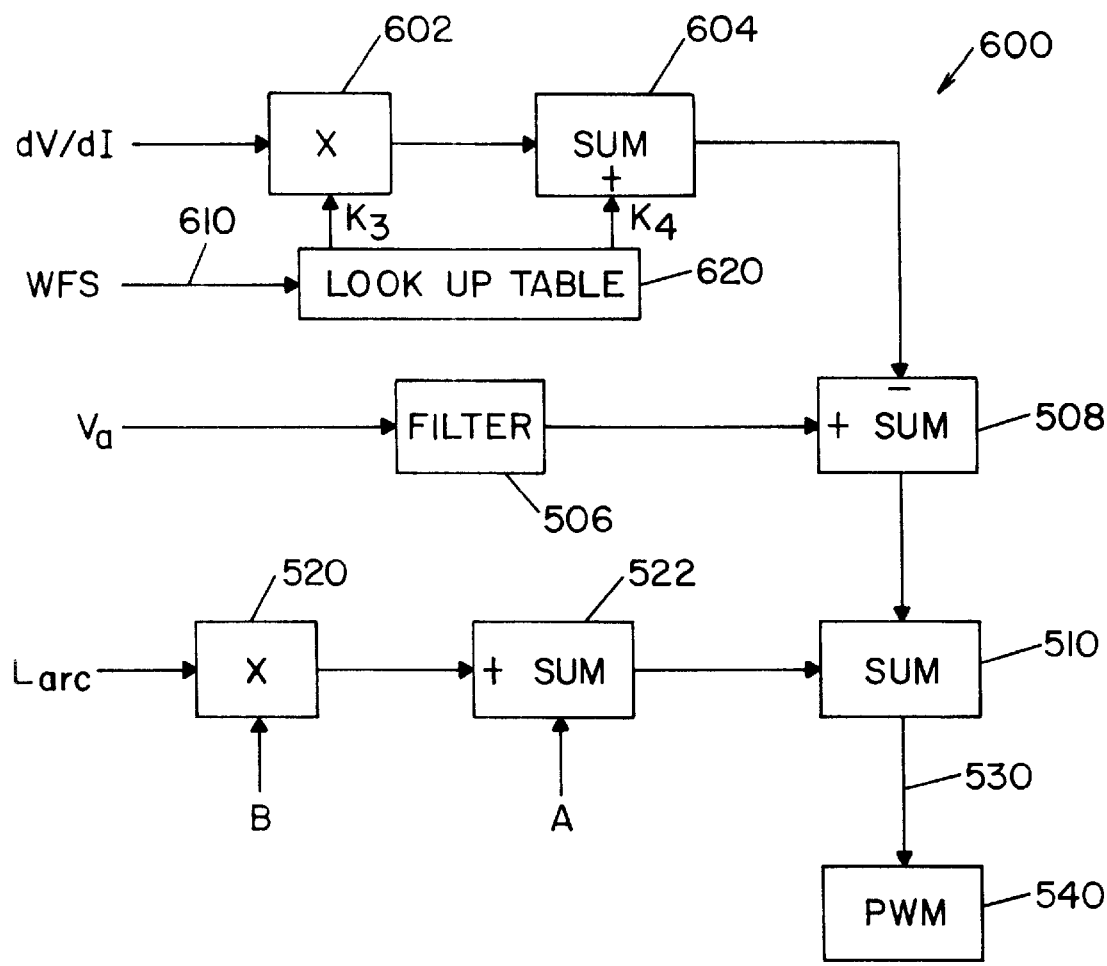

A simplified alternative to the implemented systems 500 and 500' shown in FIG. 12 and FIG. 13 is provided by software control system 600 in FIG. 14. Control function $K_1 I_a$ dV/dI provided by blocks 502 and 504 of FIG. 12 and blocks 502' and 504' of FIG. 13 can be simplified to avoid using welding current $I_a$. It has been found empirically that $I_a$ dV/dI is equal to $K_3$ dV/dI+$K_4$. The constants $K_3$ and $K_4$ are derived empirically. System 600 maintains arc length components numbered like components in system 500. Elements 502 and 504 are replaced by blocks 602 to multiply $K_3$ and dV/dI and 604 to add $K_4$ The arc length is maintained. In practice, the wire feed speed is line 610 set with the arc length. A value of WFS on line 610 to look up table 620 to empirically obtain constants $K_3$ and $K_4$ for a specific wire speed. The software system controls the arc length using novel signal dV/dI. As can be appreciated, other variations and control systems can be developed mathematically or empirically to use the novel control signal dV/dI, especially for maintaining a constant arc length.

Having thus defined the invention, the following is claimed:

1. A method of generating a real time control signal for use in an electric arc welding process having welding voltage and welding current, said method comprising: measuring the arc voltage and arc current at a first time, momentarily changing either said arc voltage or arc current by less than about 10%, then measuring said welding voltage and said welding current after said change at a second time, determining the welding voltage difference between said first time and said second time, determining the welding current difference between said first time and said second time, producing a derivative value representing said control signal by dividing said welding voltage difference between said first and second times by said welding current difference between said first and second times and generating said control signal by said derivative value.

2. A method as defined in claim 1 including producing a number of said derivative values at successive times and generating said control signal by averaging said derivative values.

3. A method as defined in claim 2 wherein said changing is by changing said welding current.

4. The method as defined in claim 3 wherein said number is at least 3.

5. The method as defined in claim 3 wherein said number is divisible by 3.

6. A method as defined in claim 2 wherein said number is at least 3.

7. The method as defined in claim 2 wherein said number is divisible by 3.

8. A method as defined in claim 1 wherein said changing is by changing said welding current.

9. A system for generating a real time control signal for use in an electric arc welder having a power supply for generating a welding voltage between a contact tip and a workpiece and a welding current through said electrode extending from said tip and through a electric arc, a sensor to sense the welding voltage; a sensor to sense the welding current and controller to control said welding voltage and/or said welding current, said system comprising: a digital device recording the welding voltage and welding current at a first time and then at a second time, a control device to change said welding current between said first time and said second time, a digital device for measuring the difference between said welding voltage and said welding current at said first and second time, and a derivative circuit for measuring the value of the welding voltage difference divided by the welding current difference to produce said control signal.

10. A method of generating a real time control signal for use in an electric arc welding process having a welding voltage and welding current, said method comprising: measuring the process welding voltage and process welding current at a first time, increasing the welding current above the process welding current, after a first time delay again measuring the welding voltage and welding current at a second time, then decreasing the welding current to below the process welding current, after a second time delay measuring the welding voltage and welding current at a third time, then increasing said welding current to near said process welding current, after a third time delay measuring said welding voltage and said welding current at a fourth time, determining the difference of said welding voltage and said welding current between said second and third times and dividing said voltage difference by said current difference to generate said control signal.

11. A method as defined in claim 10 wherein each of said time delays is greater than about 50 microseconds.

12. A method as defined in claim 11 including multiplying said control signal by the process welding current to obtain a signal representative of electrode stickout voltage and using said representative signal as a closed loop feedback to control the electrode stickout of said welding process.

13. A method as defined in claim 11 including multiplying said control signal by the process arc current to give a first value representative of the electrode stickout voltage, subtracting said representative stickout voltage signal from the process arc voltage to give a second value representative of the voltage across the arc of the welding process, subtracting a first known constant from said second value to give a third value and then dividing said third value by a second known constant to obtain a signal representative of arc length and using said representative signal as a closed loop feedback to control the arc length of said welding process.

14. A method as defined in claim 13, wherein said first known constant is about 8–20.

15. A method as defined in claim 13, wherein said second known constant is in the range of 10–35.

16. A method as defined in claim 10 including determining the difference of said arc voltage and said arc current between said first and second times, determining the difference of said arc voltage and arc current between said third and fourth times, dividing said arc voltage differences by said arc current differences, adding said three quotients and dividing said value by 3 to generate said control signal.

17. A method as defined in claim 16 wherein each of said time delays is greater than about 50 microseconds.

18. A method as defined in claim 17 including multiplying said control signal by the process welding current to obtain a signal representative of electrode stickout voltage and using said representative signal as a closed loop feedback to control the electrode stickout of said welding process.

19. A method as defined in claim 17 including multiplying said control signal by the process welding current to give a first value representative of the electrode stickout voltage, subtracting said representative stickout voltage signal from the process welding voltage to give a second value representative of the voltage across the arc of the welding process, subtracting a first known constant from said second value to give a third value and then dividing said third value by a second known constant to obtain a signal representative of arc length and using said representative signal as a closed loop feedback to control the arc length of said welding process.

20. A method as defined in claim 19, wherein said first known constant is about 8–20.

21. A method as defined in claim 19, wherein said second known constant is in the range of 10–35.

22. A method as defined in claim 16 including multiplying said control signal by the process welding current to obtain a signal representative of electrode stickout voltage and using said representative signal as a closed loop feedback to control the electrode stickout of said welding process.

23. A method as defined in claim 16 including multiplying said control signal by the process arc current to give a first value representative of the electrode stickout voltage, subtracting said representative stickout voltage signal from the process arc voltage to give a second value representative of the voltage across the arc of the welding process, subtracting a first known constant from said second value to give a third value and then dividing said third value by a second known constant to obtain a signal representative of arc length and using said representative signal as a closed loop feedback to control the arc length of said welding process.

24. A method as defined in claim 23, wherein said first known constant is about 8–20.

25. A method as defined in claim 23, wherein said second known constant is in the range of 10–35.

26. A method as defined in claim 10 including multiplying said control signal by the process welding current to obtain a signal representative of electrode stickout voltage and using said representative signal as a closed loop feedback to control the electrode stickout of said welding process.

27. A method as defined in claim 10 including multiplying said control signal by the process arc current to give a first value representative of the electrode stickout voltage, subtracting said representative stickout voltage signal from the process arc voltage to give a second value representative of the voltage across the arc of the welding process, subtracting a first known constant from said second value to give a third value and then dividing said third value by a second known constant to obtain a signal representative of arc length and using said representative signal as a closed loop feedback to control the arc length of said welding process.

28. A method as defined in claim 27, wherein said first known constant is about 8–20.

29. A method as defined in claim 27, wherein said second known constant is in the range of 10–35.

30. A method of generating a real time control signal for use in an electric arc welding process having a process welding voltage and process welding current, said method comprising sensing the derivative of said welding voltage with respect to welding current to generate said control signal.

31. A method as defined in claim 30 including multiplying said control signal by the process welding current to obtain a signal representative of electrode stickout voltage and using said representative signal as a closed loop feedback to control the electrode stickout of said welding process.

32. A method as defined in claim 30 including multiplying said control signal by the process welding current to give a first value representative of the electrode stickout voltage, subtracting said representative stickout voltage signal from the process welding voltage to give a second value representative of the voltage across the arc of the welding process, subtracting a first known constant from said second value to give a third value and then dividing said third value by a second known constant to obtain a signal representative of arc length and using said representative signal as a closed loop feedback to control the arc length of said welding process.

33. A method as defined in claim 32, wherein said first known constant is about 8–20.

34. A method as defined in claim 32, wherein said second known constant is in the range of 10–35.

35. A method as defined in claim 30 including multiplying said control signal by a constant related to the arc resistance to obtain a signal level, subtracting said signal level from a signal representing the real time welding voltage and comparing the difference signal with an arc length signal representing the arc length multiplied by a second constant and added to a first constant to create a feedback signal to maintain the arc length nearly constant.

36. A method as defined in claim 35, wherein said first known constant is about 8–20.

37. A method as defined in claim 35, wherein said second known constant is in the range of 10–35.

38. An arc welder for performing an arc welding process comprising a power supply for creating a welding current and welding voltage with a controller for maintaining a preselected established current wave form, said welder including a circuit for increasing said welding current by a level above said established current by less than 10% of said established current at a first time, holding said level for a time delay, then reducing said welding current at least to about said established current at a second time, sensors for measuring said welding voltage and welding currents at said first and said second time, a circuit for subtracting said two voltages to give a value and a circuit for dividing said value by the difference of said two currents to create a signal for use in controlling a selected parameter in said welding process.

39. A welder as defined in claim 38, wherein said selected parameter is arc length.

* * * * *